United States Patent
Ray et al.

(10) Patent No.: US 11,314,940 B2
(45) Date of Patent: Apr. 26, 2022

(54) CROSS DOMAIN PERSONALIZED VOCABULARY LEARNING IN INTELLIGENT ASSISTANTS

(71) Applicant: Samsung Electronics Co., Ltd., Suwon-si (KR)

(72) Inventors: Avik Ray, Sunnyvale, CA (US); Yilin Shen, Sunnyvale, CA (US); Hongxia Jin, Mountain View, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 103 days.

(21) Appl. No.: 15/986,633

(22) Filed: May 22, 2018

(65) Prior Publication Data

US 2019/0361978 A1 Nov. 28, 2019

(51) Int. Cl.
| | |
|---|---|
| *G10L 15/22* | (2006.01) |
| *G06F 40/30* | (2020.01) |
| *G06F 9/451* | (2018.01) |
| *G06N 5/02* | (2006.01) |
| *G06F 40/205* | (2020.01) |
| *G06F 40/253* | (2020.01) |
| *G10L 15/07* | (2013.01) |
| *G10L 15/06* | (2013.01) |

(52) U.S. Cl.
CPC .............. *G06F 40/30* (2020.01); *G06F 9/453* (2018.02); *G06F 40/205* (2020.01); *G06F 40/253* (2020.01); *G06N 5/02* (2013.01); *G10L 15/07* (2013.01); *G10L 15/075* (2013.01); *G10L 15/063* (2013.01); *G10L 15/22* (2013.01); *G10L 2015/0635* (2013.01); *G10L 2015/227* (2013.01)

(58) Field of Classification Search
None
See application file for complete search history.

(56) References Cited

U.S. PATENT DOCUMENTS

| | | | |
|---|---|---|---|
| 7,987,176 B2 * | 7/2011 | Latzina | ................. G06F 16/338 707/713 |
| 8,041,697 B2 | 10/2011 | Rayner et al. | |
| 8,478,780 B2 | 7/2013 | Cooper et al. | |

(Continued)

FOREIGN PATENT DOCUMENTS

| | | |
|---|---|---|
| JP | 2002-215184 A | 7/2002 |
| JP | 2005321520 A | 11/2005 |

(Continued)

OTHER PUBLICATIONS

U.S. Non-Final Office Action for U.S. Appl. No. 15/904,203 dated Sep. 27, 2019.

(Continued)

*Primary Examiner* — Richard Z Zhu
(74) *Attorney, Agent, or Firm* — Sherman IP LLP; Kenneth L. Sherman; Steven Laut

(57) ABSTRACT

A method includes determining, by an electronic device, a skill from a first natural language (NL) input. Upon successful determination of the skill, the first NL input is transmitted to a custom skill parser for determination of a skill intent. The custom skill parser is trained based on data including at least a custom training data set. Upon unsuccessful determination of the skill, the first NL input is transmitted to a generic parser for determination of a general intent of the first NL input.

20 Claims, 14 Drawing Sheets

(56) References Cited

U.S. PATENT DOCUMENTS

| | | | |
|---|---|---|---|
| 8,612,204 B1* | 12/2013 | Uszkoreit | G06F 40/44 |
| | | | 704/2 |
| 8,935,676 B2 | 1/2015 | Verbest et al. | |
| 9,117,450 B2* | 8/2015 | Cook | G10L 15/26 |
| 9,147,395 B2 | 9/2015 | Kim et al. | |
| 9,262,404 B2 | 2/2016 | Ingram et al. | |
| 9,529,794 B2 | 12/2016 | Levit et al. | |
| 9,684,496 B1 | 6/2017 | Reid et al. | |
| 9,710,243 B2 | 7/2017 | O'Hara et al. | |
| 9,711,056 B1 | 7/2017 | Nguyen et al. | |
| 9,922,642 B2 | 3/2018 | Pitschel et al. | |
| 10,445,423 B2* | 10/2019 | Boguraev | G06F 40/295 |
| 10,528,343 B2 | 1/2020 | Gass et al. | |
| 10,592,313 B2 | 3/2020 | Geleji et al. | |
| 2003/0204391 A1 | 10/2003 | May et al. | |
| 2007/0038436 A1 | 2/2007 | Cristo et al. | |
| 2007/0112714 A1 | 5/2007 | Fairweather | |
| 2008/0195601 A1 | 8/2008 | Ntoulas et al. | |
| 2010/0088262 A1 | 4/2010 | Visel et al. | |
| 2010/0312469 A1 | 12/2010 | Chen et al. | |
| 2012/0016678 A1* | 1/2012 | Gruber | B60K 35/00 |
| | | | 704/275 |
| 2013/0041669 A1 | 2/2013 | Ben-David et al. | |
| 2013/0073571 A1* | 3/2013 | Coulet | G06F 40/30 |
| | | | 707/755 |
| 2013/0152092 A1 | 6/2013 | Yadgar et al. | |
| 2013/0311166 A1* | 11/2013 | Yanpolsky | G06F 8/30 |
| | | | 704/2 |
| 2014/0163965 A1 | 6/2014 | Barve et al. | |
| 2014/0180692 A1 | 6/2014 | Joshi et al. | |
| 2014/0222422 A1* | 8/2014 | Sarikaya | G06F 40/35 |
| | | | 704/231 |
| 2014/0272821 A1* | 9/2014 | Pitschel | G09B 19/06 |
| | | | 434/157 |
| 2015/0039292 A1* | 2/2015 | Suleman | G06F 40/216 |
| | | | 704/9 |
| 2015/0134334 A1 | 5/2015 | Sachidanandam et al. | |
| 2015/0149177 A1 | 5/2015 | Kalns et al. | |
| 2015/0161984 A1* | 6/2015 | VanBlon | G10L 15/22 |
| | | | 704/244 |
| 2015/0186504 A1 | 7/2015 | Gorman et al. | |
| 2015/0317302 A1* | 11/2015 | Liu | G06F 16/90332 |
| | | | 704/9 |
| 2015/0348551 A1 | 12/2015 | Gruber et al. | |
| 2015/0356142 A1 | 12/2015 | Proux et al. | |
| 2016/0062982 A1 | 3/2016 | Wroczynski et al. | |
| 2016/0111084 A1 | 4/2016 | Bang et al. | |
| 2016/0179785 A1 | 6/2016 | Ashtiani et al. | |
| 2016/0225370 A1 | 8/2016 | Kannan et al. | |
| 2017/0125020 A1 | 5/2017 | Seo | |
| 2017/0140754 A1 | 5/2017 | Ichimura | |
| 2017/0220559 A1 | 8/2017 | Fujiwara et al. | |
| 2017/0221475 A1 | 8/2017 | Bruguier et al. | |
| 2017/0365252 A1 | 12/2017 | Ushio et al. | |
| 2018/0011838 A1 | 1/2018 | Beller et al. | |
| 2018/0033435 A1 | 2/2018 | Jacobs | |
| 2019/0266237 A1 | 8/2019 | Ray et al. | |
| 2019/0306107 A1* | 10/2019 | Galbraith | G06N 20/00 |
| 2019/0370615 A1* | 12/2019 | Murphy | G06Q 10/0633 |
| 2019/0371296 A1* | 12/2019 | Iwase | G10L 15/30 |

FOREIGN PATENT DOCUMENTS

| | | |
|---|---|---|
| JP | 4064413 B2 | 1/2007 |
| JP | 2007-323296 A | 12/2007 |
| JP | 2010-256498 | 11/2010 |
| JP | 4680714 B2 | 2/2011 |
| KR | 2010-0027865 | 3/2010 |
| KR | 2014-0037519 A | 3/2014 |
| KR | 2010-1399777 | 5/2014 |
| WO | 2018071594 A | 4/2018 |
| WO | 2018081833 A | 5/2018 |

OTHER PUBLICATIONS

Azaria, A. et al., "Instructable Intelligent Personal Agent," In 30th AAAI Conference on Artificial Intelligence, pp. 2681-2689. Feb. 2016, United States.

International Search Report and Written Opinion dated Jul. 1, 2019 for International Application PCT/KR2019/002406 from Korean Intellectual Property Office, pp. 1-11, Republic of Korea.

International Search Report and Written Opinion dated May 21, 2019 for International Application PCT/KR2019/002024 from Korean Intellectual Property Office, pp. 1-10, Republic of Korea.

Liu, X. et al., "Paraphrase Features to Improve Natural Language Understanding", pp. 3776-3779, INTERSPEECH 2013, Aug. 25-29, 2013, United States.

U.S. Advisory Action for U.S. Appl. No. 15/904,203 dated Apr. 17, 2020.

U.S. Final Office Action for U.S. Appl. No. 15/904,203 dated Feb. 20, 2020.

U.S. Non-Final Office Action for U.S. Appl. No. 15/904,203 dated Jul. 23, 2020.

U.S. Final Office Action for U.S. Appl. No. 15/904,203 dated Dec. 14, 2020.

U.S. Advisory Action for U.S. Appl. No. 15/904,203 dated Feb. 19, 2021.

Extended European Search Report dated Oct. 30, 2020 for European Application No. 19807753.9 from European Patent Office. pp. 1-7, Munich, Germany.

Extended European Search Report dated Oct. 20, 2020 for European Application No. 19757283.7 from European Patent Office, pp. 1-8, Munich, Germany.

U.S. Non-Final Office Action for U.S. Appl. No. 15/904,203 dated Apr. 9, 2021.

Indian Office Action dated Jun. 27, 2021 for Indian Application No. 202037045078 from Intellectual Property India, pp. 1-7, Chennai, India.

U.S. Notice of Allowance for U.S. Appl. No. 15/904,203 dated Jul. 16, 2021.

Indian Office Action dated Sep. 2, 2021 for Indian Application No. 202017036258 from Intellectual Property India, pp. 1-6, Chennai, India.

European Office Action dated Mar. 3, 2022 for European Application No. 19807753.9 from European Patent Office, pp. 1-6, Munich, Germany.

* cited by examiner

1410 — Input: deliver some pizza to my home by noon

1470 — Rephrased and swapped utterances (by combining first and second replacement):

get me some pizza back home by noon
by noon get me some pizza and home
i want a pizza before noon back home
before noon i want a pizza back home
to home get me some pizza via noon buy a pizza for home before noon
for home buy some pizza before noon
around noon buy a pizza to home
buy a pizza by noon back home
get me some pizza by noon to home ......

1480 — Final output of ranked paraphrase:

1490 —
get me some pizza back home by noon
buy a pizza for home before noon
i want a pizza before noon back home
before noon i want a pizza back home
around noon buy a pizza to home
get me some pizza by noon to home High Ranked Results 1495 —
by noon get me some pizza and home
for home buy some pizza before noon
to home get me some pizza via noon
buy a pizza by noon back home Low Ranked Results

```
┌─────────────────────────────────────────────────┐
│ Determining, By An Electronic Device, A Skill From A │─── 1510
│      First Natural Language (NL) Input           │
└─────────────────────────────────────────────────┘
                        ↓
┌─────────────────────────────────────────────────┐
│ Upon Successful Determination Of The Skill,     │
│ Transmitting The First NL Input To A Custom Skill│
│ Parser For Determination Of A Skill Intent (The │
│ Custom Skill Parser Is Trained Based On A Custom│─── 1520
│ Training Data Set And A Combination Of A Plurality│
│ Of Skill Training Data Sets, and Each Skill Training│
│ Data Set Of The Plurality Of Skill Training Data Sets│
│ Includes Data Specific To A Distinctive Skill Of A Set│
│                  Of Skills)                      │
└─────────────────────────────────────────────────┘
                        ↓
┌─────────────────────────────────────────────────┐
│ Upon Unsuccessful Determination Of The Skill, Transmitting│
│ The First NL Input To A Generic Parser For Determination Of A│─── 1530
│      General Intent Of The First NL Input       │
└─────────────────────────────────────────────────┘
                        ↓
┌─────────────────────────────────────────────────┐
│ Upon Successful Determination Of The Skill Intent, Adding│─── 1540
│         The Skill To The Set Of Skills          │
└─────────────────────────────────────────────────┘
                        ↓
┌─────────────────────────────────────────────────┐
│ Upon Unsuccessful Determination Of The Skill Intent,│
│ Prompting For A Second NL Input, Wherein The Second NL│─── 1550
│    Input Is A Paraphrase Of The First NL Input  │
└─────────────────────────────────────────────────┘
```

FIG. 15

CROSS DOMAIN PERSONALIZED VOCABULARY LEARNING IN INTELLIGENT ASSISTANTS

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments generally relate to personal assistants and, in particular, to learning cross domain personalized vocabulary and automatically generate structure variational paraphrases in smart personal assistants.

BACKGROUND

Natural language understanding (NLU) is crucial in personal assistants. NLU helps understand a user's utterance and carry out the intent of the user. Each intent can be expressed in many different ways using very different utterances. One important variability arises from the appearance of partial content (e.g., adjuncts, noun phrases, etc.) at different portions in an utterance, as well as the different expressions of such content. For example, for an utterance of "get me a pizza to home by this evening," it can also be stated as follows: "by this evening get me a pizza to," "get me a pizza for home before this evening," "to home, buy me a pizza in this evening," etc. Such variability of one utterance is crucial to train a NLU engine. Otherwise, the NLU engine can only understand a limited number of fixed formats and fails to carry out a user's intent in many scenarios.

For each specific content, however, it cannot be arbitrarily placed into the sentence. The results of doing so will either change the semantic meaning of the whole utterance, or leave the new utterance completely meaningless. For example, consider the example "get me a pizza to home by this evening." There could be many invalid utterances "get to home me a pizza by this evening," "get to home by this evening a pizza," etc. Therefore, it is non-trivial to generate paraphrases that enable the appearance of partial contents at their correct places.

State-of-the-art approaches/tools (e.g., API.ai, etc.) or state-of-the-practice digital assistant products heavily rely on a user's manual inputs of utterances to cover the structural variational paraphrases for each intent. Existing paraphrase generation tools may use several simple syntax based sentence fragment rearrangement algorithms, resulting in incorrect paraphrases. Unfortunately, these approaches cannot scalably support a large number of correct variations of an utterance to generate a good training dataset for an NLU engine.

Intelligent personal assistants (PA) are automated artificial intelligence (AI) systems which can take natural language input from a user and perform an action as desired by the user. In order to enable a PA to perform more actions in a variety of domains, some PAs also provide a special "skills framework" for developers. Using this framework, a developer can add any domain specific skill to the PA, enabling it to understand natural language instructions and perform useful actions in that domain. However, the extent to which the PA is able to understand domain specific utterances are limited by the example utterances provided to the skills framework by the skill developer. Such examples provided by the developer are often limited and does not cover the huge variety of natural language utterances and paraphrases the users can provide to the PA, often using some preferred personal vocabulary. More importantly, the skills framework in current systems cannot leverage the examples provided for one particular skill to enhance the PA's vocabulary or natural language understanding capabilities for some other skill.

SUMMARY

One or more embodiments generally relate to learning cross domain personalized vocabulary and generation of structure variational paraphrases in intelligent personal assistants. In one embodiment, a method includes determining, by an electronic device, a skill from a first natural language (NL) input. Upon successful determination of the skill, the first NL input is transmitted to a custom skill parser for determination of a skill intent. The custom skill parser is trained based on data including at least a custom training data set. Upon unsuccessful determination of the skill, the first NL input is transmitted to a generic parser for determination of a general intent of the first NL input.

In another embodiment, an electronic device includes a memory storing instructions. At least one processor executes the instructions including a process configured to: determine a skill from a first NL input, upon successful determination of the skill, transmit the first NL input to a custom skill parser for determination of a skill intent, wherein the custom skill parser is trained based on data including at least a custom training data set, and upon unsuccessful determination of the skill, transmit the first NL input to a generic parser for determination of a general intent of the first NL input.

In one embodiment a non-transitory processor-readable medium that includes a program that when executed by a processor performing a method that includes determining, by an electronic device, a skill from a first NL input. Upon successful determination of the skill, the first NL input is transmitted to a custom skill parser for determination of a skill intent. The custom skill parser is trained based on data including at least a custom training data set. Upon unsuccessful determination of the skill, the first NL input is transmitted to a generic parser for determination of a general intent of the first NL input.

In yet another embodiment, a method for intelligent assistance that includes generating one or more segments for an NL input, where each segment is based on its dependency on an action term of the NL input. A leading segment is identified from the one or more segments. A first replacement phrase is generated based on concatenation of the leading segment with each non-leading segment of the one or more segments. An output is provided that includes at least a portion of the input and the first replacement phrase.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 14A-B shows an example of rephrased and swapped utterances and an output of ranked paraphrases, according to some embodiments;

FIG. 15 shows a block diagram of a process for generating structural variational paraphrases, according to some embodiments.

DETAILED DESCRIPTION

Figure 1:
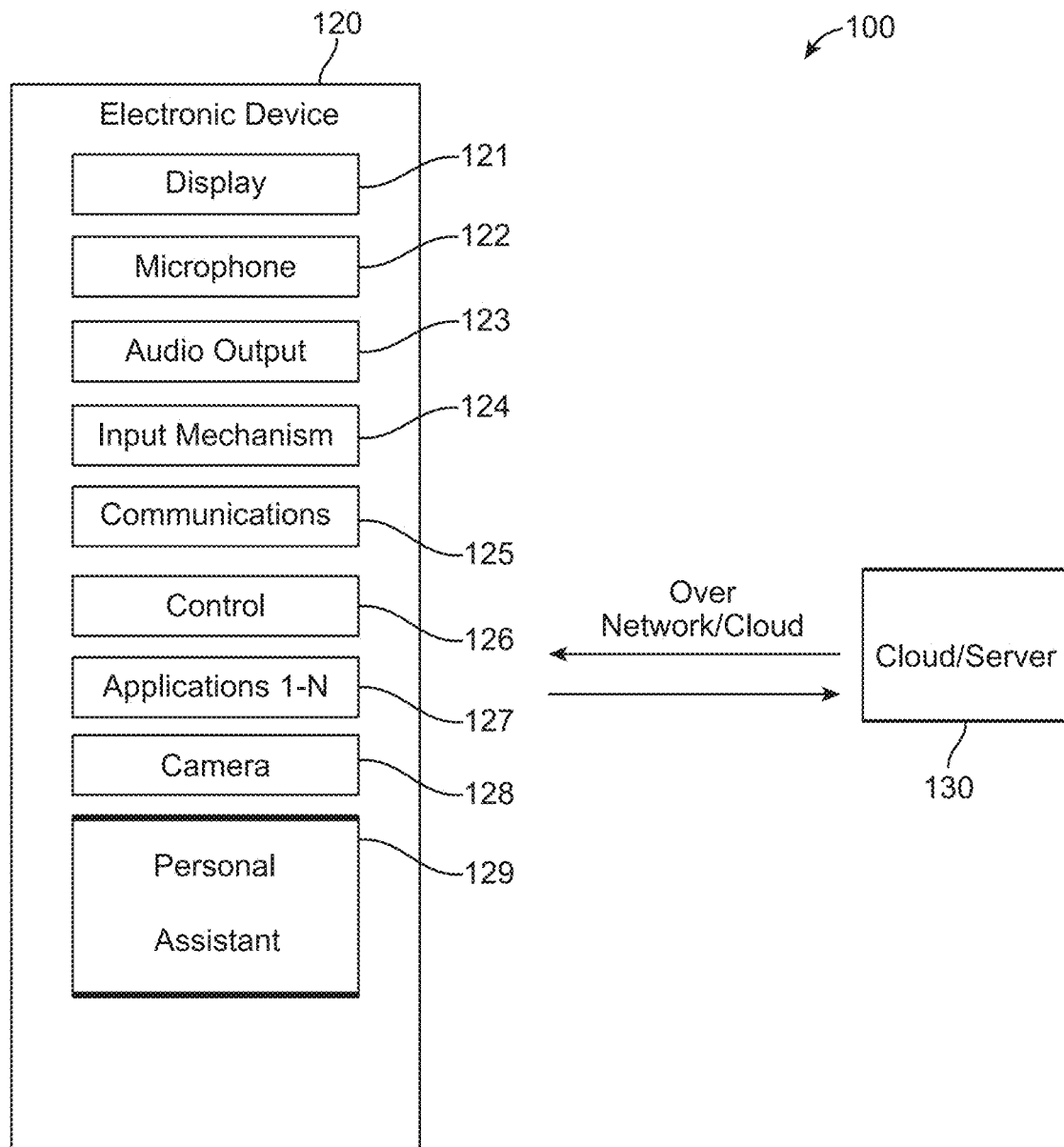
FIG. 1 shows a block diagram of architecture for a system including an electronic device including a personal assistant app, according to some embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

It should be noted that the terms "at least one of" refers to one or more than one of the elements that follow. For example, "at least one of a, b, c, or a combination thereof" may be interpreted as "a," "b," or "c" individually; or as "a" and "b" together in combination, as "b" and "c" together in combination; as "a" and "c" together in combination; or as "a," "b" and "c" together in combination.

One or more embodiments provide for learning cross domain personalized vocabulary and generation of structure variational paraphrases in intelligent personal assistants. Some embodiments include a method that includes determining, by an electronic device, a skill from a first NL input. Upon successful determination of the skill, the first NL input is transmitted to a custom skill parser for determination of a skill intent. The custom skill parser is trained based on data including at least a custom training data set. Upon unsuccessful determination of the skill, the first NL input is transmitted to a generic parser for determination of a general intent of the first NL input.

In some embodiments, in order to enable a personal assistant (PA) (e.g., PA 129, FIG. 1) to learn personalized vocabulary used by its end user, a "personalized skill parser" 360 (FIGS. 3 and 6) may be implemented for each user which can parse skill specific utterances for the set of skills being used by the user. Some embodiments automatically generate structure variational paraphrases, and use them to train a NLU engine. The generated structure variational paraphrases may largely enrich the variability of a training set in order to train an improved NLU engine for the PA 129.

In some embodiments, the structure variational paraphrases that are generated allow appearances of partial content at different correct places in an utterance. One or more embodiments automate user manual generation of such structure variational utterances for each intent, therefore reducing the cost of skill development for a personal assistant. Some embodiments provide an interface for inputting user specified parts of content in an utterance which a user desires to generate its variability of expressions. In one embodiment, a new structure of a paraphrase of an utterance is generated by swapping a part of contents with other parts of the utterance. A different expression of each part of contents may be generated, and rephrasing the details in utterances is provided to generate more paraphrases. In one embodiment, the ranking of generated structure variational paraphrases is also provided. Outputs from processing may be directly used to train existing NLU engines.

FIG. 1 shows a functional block diagram of an architecture system 100 that may be used for PAs to enhance natural language understanding capabilities and personalization for PAs such as BIXBY® using an electronic device 120 (e.g., mobile telephone devices, television (TV) systems, cameras, camcorders, a device with audio video capabilities, tablets, pad devices, wearable devices, smart appliances, smart picture frames, smart lighting, etc.). In one embodiment, the electronic device 120 may comprise a display 121, a microphone 122, an audio output 123, an input mechanism 124, communications circuitry 125, control circuitry 126, a camera 128, a personal assistant (or PA) 129 (including, at least, processing for personalized skill intent parsing 300, FIG. 3, a personal skill parser 360 (FIGS. 3 and 6), and segmentation rephrasing and swapping 700 processing, FIG. 7), and communicating with the communications circuitry 125 to obtain/provide information thereof with the cloud or server 130; and may include any of the processing for, but not limited to, the examples and embodiments as described below), and any other suitable components. In one embodiment, applications 1-N 127 are provided and may be obtained from a cloud or server 130, a communications network 110, etc., where N is a positive integer equal to or greater than 1.

In one embodiment, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In one embodiment, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., BLUETOOTH® headphones or a BLUETOOTH® headset).

In one embodiment, the display 121 may include any suitable screen or projection system for providing a display visible to the user. For example, display 121 may include a screen (e.g., an LCD screen, LED screen, OLED screen, etc.) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, mouse, visual pointer, remote control, one or more sensors (e.g., a camera or visual sensor, a light sensor, a proximity sensor, etc., or a touch screen. The input mechanism 124 may include a multi-touch screen.

In one embodiment, communications circuitry 125 may be any suitable communications circuitry operative to connect to a communications network and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quad-band, and other cellular protocols, VOIP, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the BLUETOOTH® protocol to couple the electronics device 120 with a BLUETOOTH® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include applications 1-N 127 including, but not limited to: an automatic speech recognition (ASR) application, OCR application, a dialog application, a map application, a media application (e.g., QuickTime, MobileMusic.app, or MobileVideo.app), social networking applications (e.g., FACEBOOK®, INSTAGRAM®, TWITTER®, etc.), a calendaring application (e.g., a calendar for managing events, appointments, etc.), an Internet browsing application, etc. In some embodiments, the electronics device 120 may include one or multiple applications operative to perform communications operations. For example, the electronics device 120 may include a messaging application, an e-mail application, a voicemail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In one embodiment, the camera module 128 comprises one or more camera devices that include functionality for capturing still and video images, editing functionality, communication interoperability for sending, sharing, etc. photos/videos, etc.

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

"Skill" refers to a specialized domain where the PA can understand/interpret/parse commands related to that domain. For example, in "picture gallery skill" the PA can understand commands like "show my latest trip photos." An "intent" refers to the specific goal the user wants to accomplish within a domain or "skill." For example, in "picture gallery skill" the command "show my latest trip photos" refers to a intent "DISPLAY-PICTURE," whereas the command "send my latest trip photos to my mom" may correspond to a different intent "SHARE-PICTURE." The PA may determine the skill being used by special skill invocation command, for example "open Samsung shopping," which precedes the main command; or by string matching when an unique "skill invocation phrase/identifier" is mentioned within the command itself e.g. phrase "Samsung shopping" in utterance "Open Samsung shopping, and search Galaxy S8." In some cases, the "skill" can also be determined by special parser called "domain classifier" trained using machine learning algorithms.

Figure 2:
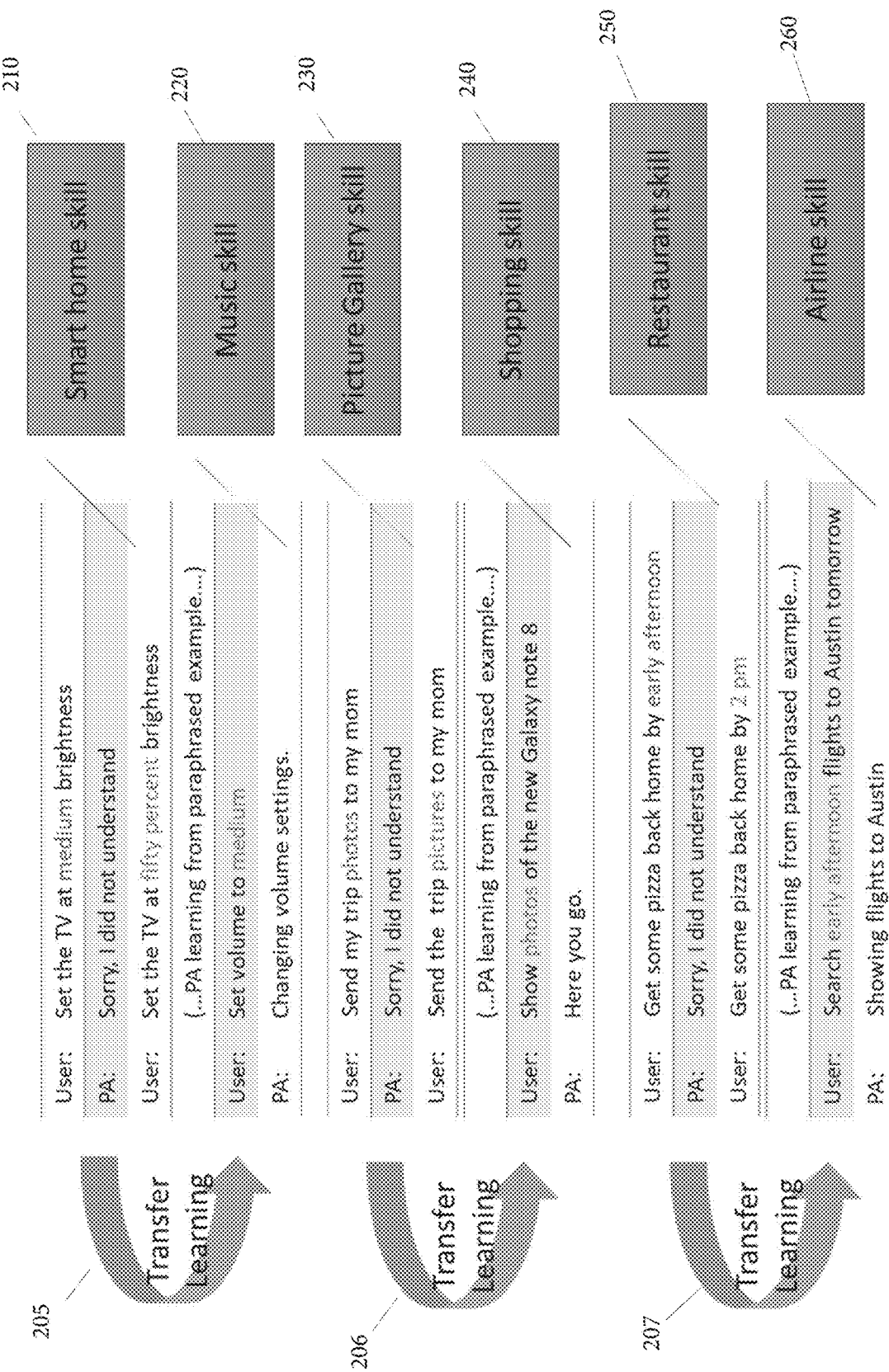
FIG. 2 shows example vocabulary and paraphrase transfer learning, according to some embodiments.

FIG. 2 shows example vocabulary and paraphrase transfer learning, according to some embodiments. In some embodiments, different domains, for example smart home skill 210, music skill 220, picture gallery skills 230, shopping skill 240, restaurant skill 250 and airline skill 260 may be present for a PA (e.g., PA 129, FIG. 1). In one example, a user utters "set the TV at medium brightness." The PA (using a smart home skill domain 210) may not understand the utterance and responds with "sorry, I did not understand." The user then rephrases the utterance as "set the TV at 50 percent brightness." The PA then learns this new vocabulary that "medium" equates to "50 percent", so that the next time the PA directly understands the intent when the user reissues the same command "set the TV at medium brightness". In some embodiments, transfer learning 205 shares or transfers the learned paraphrase of fifty percent for medium from smart home skill domain 210 to the music skill domain 220. As a result, when the user utters "set volume to medium," the PA (using music skill domain 220) changes the volume setting to fifty percent and replies with "changing volume settings."

In another example, the PA (using the picture gallery skills domain 230) may not understand an input of "send my trip photos to my mom," and responds with "sorry, I did not understand." The input is then rephrased as "send the trip pictures to my mom," which the PA may understand. In some embodiments, transfer learning 206 shares or transfers the learned paraphrase of pictures for photos from the picture gallery skills domain 230 to the shopping skill domain 240. When the user utters "show photos of the new Galaxy note 8," the PA (using the shopping skill domain 240) presents the photos based on the transferred learning 206 and replies "here you go." In still another example, the PA (using the restaurant skills domain 250) may not understand an input of "get some pizza back home by early afternoon," and responds with "sorry, I did not understand." The input is then rephrased as "get some pizza back home by 2 PM," which the PA may understand. In some embodiments, transfer learning 207 shares or transfers the learned paraphrase of early afternoon for 2 PM from the restaurant skills domain 250 to the airline skill domain 260.

Figure 3:
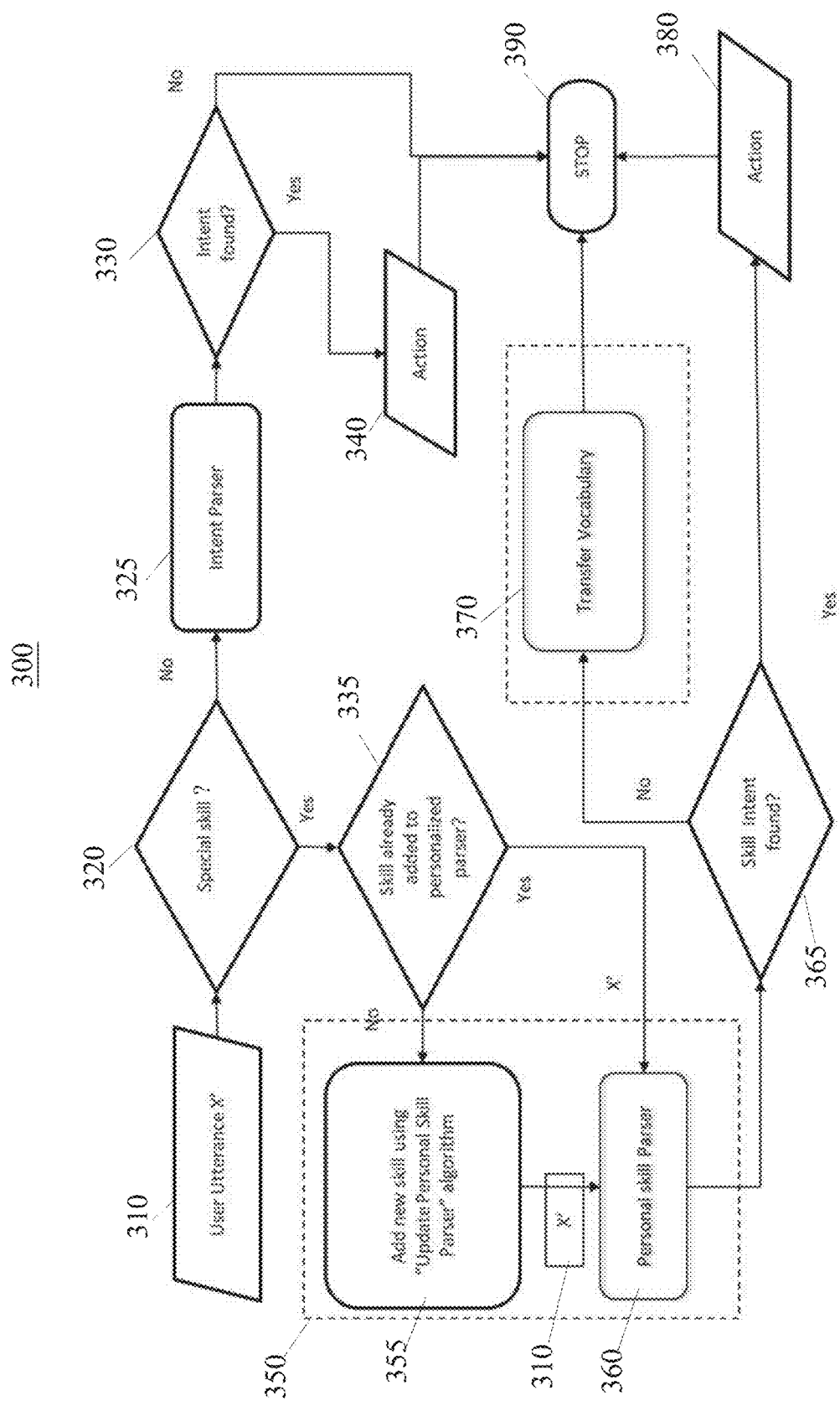
FIG. 3 shows a block diagram of processing for personalized skill intent parsing, according to some embodiments.

An out-of-the box PA can understand utterances within a fixed set of domains/skills called "default/general skills," added by the manufacturer. In addition, many new skills (typically developed by a third party) can be added to the PA on the fly by user after deployment. These third party skills are referred as "special skills." FIG. 3 shows a block diagram of processing for personalized skill intent parsing 300, according to some embodiments. The processing for personalized skill intent parsing 300 includes the following. In block 310 an utterance/input X' is received (e.g., using a PA, such as PA 129, FIG. 1). In block 320, it is determined whether the utterance X' corresponds to a "special skill" (e.g., by string matching a skill invocation phrase stored within the device or a cloud server). If it is determined that the utterance X' corresponds to a special skill, the processing for personalized skill intent parsing 300 proceeds to block 335. In block 335, it is determined whether a skill for the utterance X' is already added to a user's personalized parser of the PA or not. If it is determined that the utterance X' is already added to a user's personalized parser of the PA, the processing for personalized skill intent parsing 300 proceeds to block 360 (of the personal skill processing block 350) where the personalized skill parser is invoked. If it is determined that the utterance X' is not already added to a personalized parser of the PA, the processing for personalized skill intent parsing 300 proceeds to block 355 (of the personal skill processing block 350) where the new skill invocation keyword is added using an update personal skill parser algorithm and then processing proceeds to block 360.

In some embodiments, from block 360 the processing for personalized skill intent parsing 300 proceeds to block 365 where it is determined whether the skill intent is found or not from the personal skill parser 360. If it is determined that the skill intent is found from the personal skill parser 360, the processing for personalized skill intent parsing 300 proceeds to block 380 where an action corresponding to the determined skill intent is performed by an electronic device (e.g., electronic device 120, FIG. 1), and processing then stops at bock 390. If it is determined that the skill intent is not found from the personal skill parser 360, the processing for personalized skill intent parsing 300 proceeds to block 370 where transfer vocabulary processing is performed invoking a learn personalized vocabulary algorithm to add a new user specific vocabulary/training data to the personalized skill parser, and then processing stops at bock 390.

In some embodiments, if it is determined that the utterance X' does not include a special skill invocation phrase, the processing for personalized skill intent parsing 300 proceeds to block 325 where an intent (general skill that is not associated with any individual user) parser is invoked. Processing for personalized skill intent parsing 300 then proceeds to block 330 where it is determined whether the intent is found or not. If the intent is found, the processing for personalized skill intent parsing 300 proceeds to block 340 where a corresponding action is performed by an electronic device (e.g., electronic device 120, FIG. 1). If the intent is not found in block 330, the processing for personalized skill intent parsing 300 stops at block 390.

Figure 4:
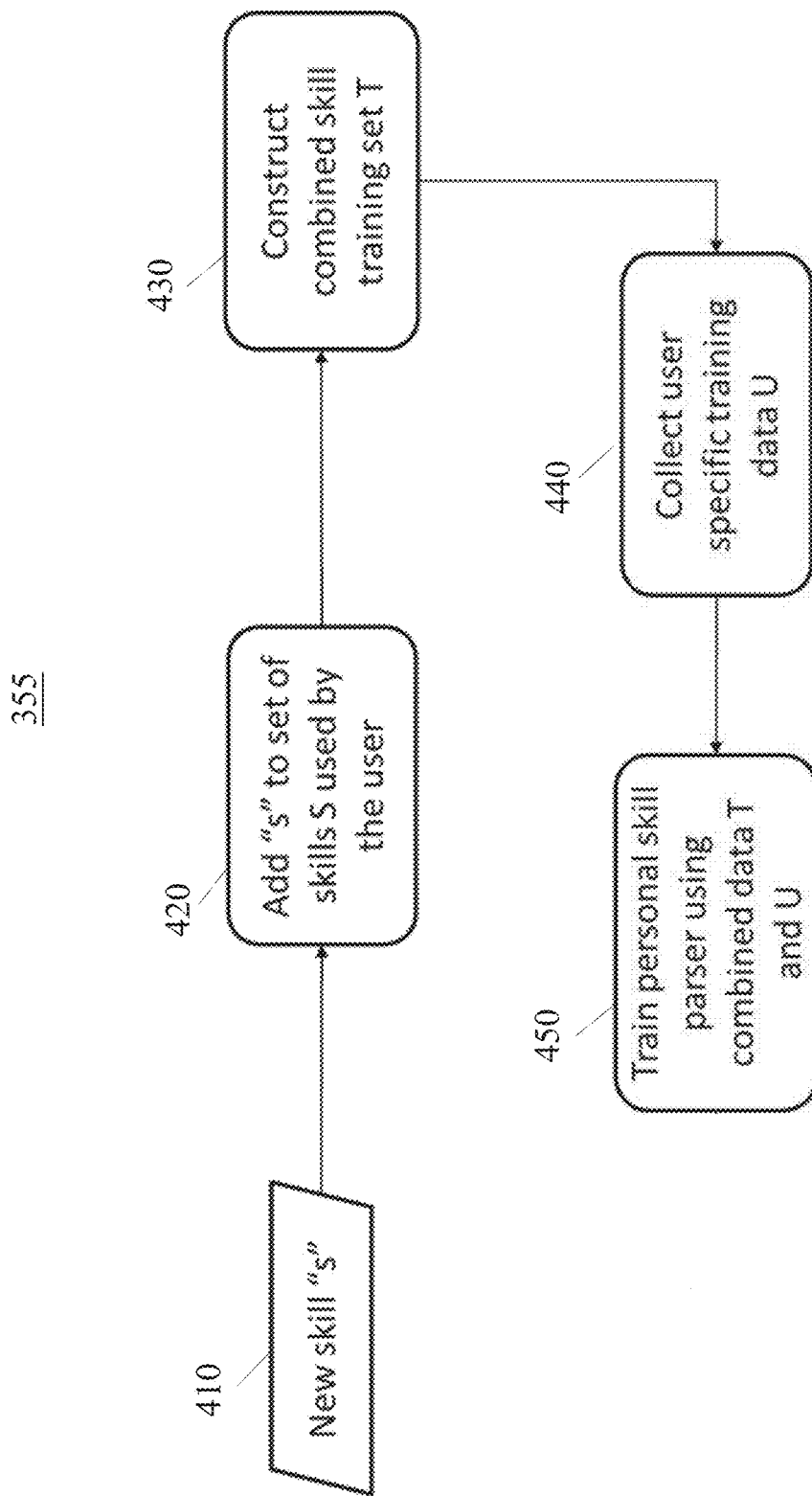
FIG. 4 shows a block diagram of processing for updating a personalized skill parser, according to some embodiments.

Each "skill" in a PA has an associated training dataset, which we refer as "skill training set." FIG. 4 shows a block diagram of processing for updating a personalized skill parser block 355, according to some embodiments. In block 410, a new custom skill (the special skill determined in 320) is input and added in block 420 to the set of skills S being used by the user. In block 430 the processing for updating a personalized skill parser constructs a "combined skill training set" T by merging the "skill training set" for every skill in set S (merging simply refers to constructing a combined training dataset containing utterances from skill training set of every skill in set S). In block 440 "user specific training data" U (which were added by the user using the Learn Personalized Vocabulary algorithm) is constructed. For example, in FIG. 2, when the user provides a paraphrased utterance "set the TV at 50 percent brightness" 205, this utterance is added to the "user specific training data" U. In block 450 a "personalized skill parser" is trained using the "combined skill training data" T and the "user specific training data" U.

Figure 5A:
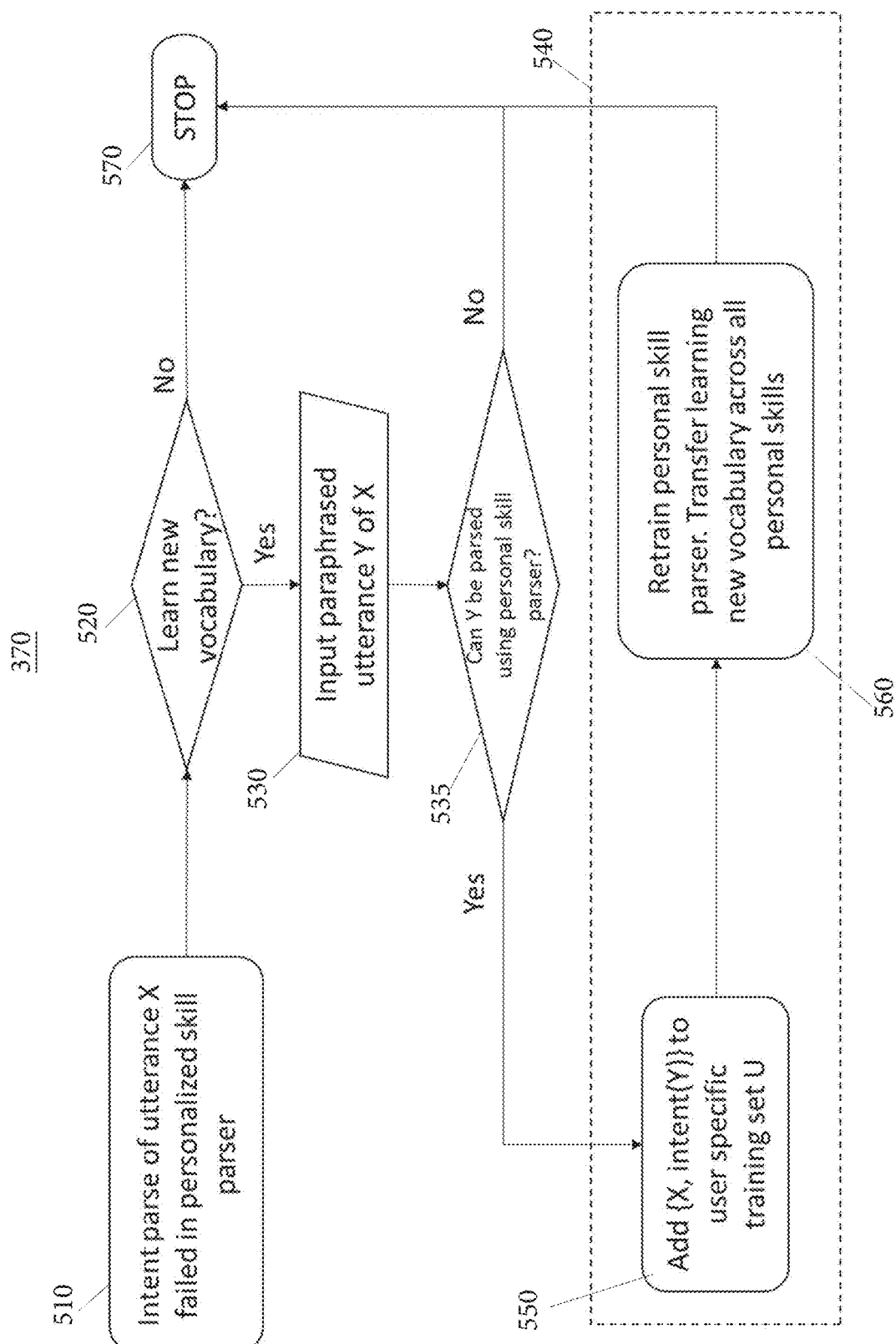
FIG. 5A shows a block diagram of processing for transferring personalized vocabulary, according to some embodiments.

FIG. 5A shows a block diagram for transferring personalized vocabulary processing block 370, according to some embodiments. In block 510, the intent parse of utterance X failed in the personal skill parser 360 (FIG. 3) (i.e., the personal skill parser 360 was unable to parse the utterance X). In block 520, it is determined whether to learn a new vocabulary or not (e.g., a user is prompted/queried if he/she wants the PA to pick up new personal vocabulary). If it is determined that a new vocabulary is not desired to be learned, then the transferring personalized vocabulary processing block 370 proceeds to block 570 and stops (e.g., a user replies "no" to the prompt/query). If it is determined that a new vocabulary is desired to be learned (e.g., a user replies "yes" to the prompt/query), the transferring personalized vocabulary processing block 370 proceeds to block 530 where a paraphrased utterance Y of X is received. In FIG. 2, for example, transfer learning 205 shows that the original utterance X is "set the TV at medium brightness," and the paraphrased utterance Y provided by the user is "set the TV at fifty percent brightness." A user is prompted to provide paraphrased utterance Y to any identified out-of-vocabulary words in X. For example, the word "medium" is highlighted as out-of-vocabulary when a user is prompted to input a paraphrase. In block 535, processing checks if Y can be parsed correctly with the personal skill parser 360 to an intent I(Y). If not, then processing declares a failure and proceeds to block 570 and stops. Otherwise, processing proceeds to the personal skill parser retraining processing 540 to block 550 and adds X along with its intent I(Y) to the "user specific training data" U. The personal skill parser 360 is retrained in block 560 using both "combined skill training data" T and "user specific training data" U. The transferring personalized vocabulary processing in block 560 proceeds to transfer learning of the new personalized vocabulary across all personalized skills S being used by the user. Processing then proceeds to block 570 and stops.

Figure 5B:
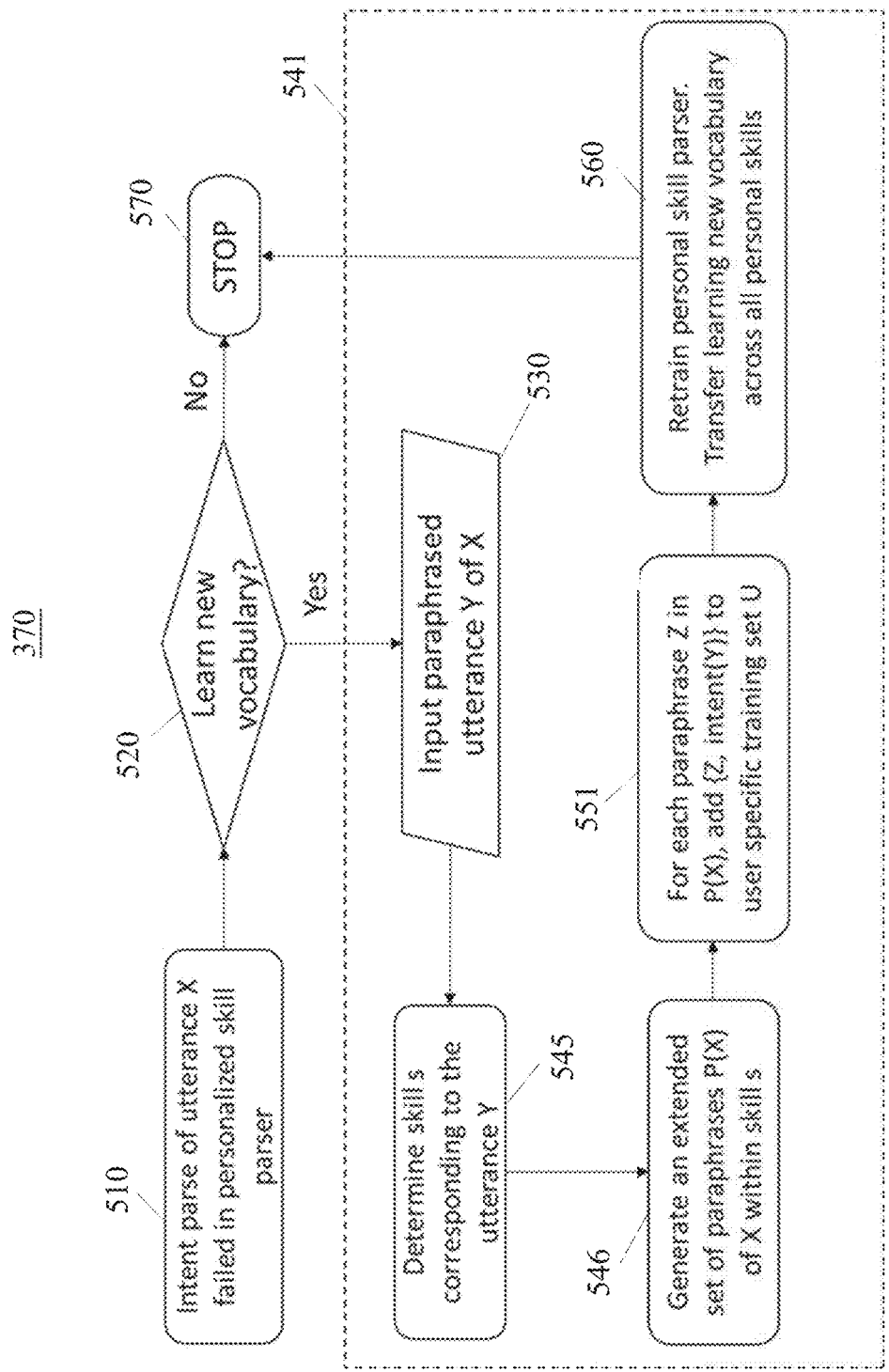
FIG. 5B shows another block diagram of processing for transferring personalized vocabulary, according to some embodiments.

FIG. 5B shows another block diagram for transferring personalized vocabulary processing block 370, according to some embodiments. In block 545 processing determines the skill s that corresponds to the utterance Y. In block 546, an extended set of paraphrases P(X) of X within the skill s is generated, also containing the user provided paraphrase Y. In block 551, for each paraphrase Z in P(X) processing adds {Z, intent(Y)} to a user specific training set U. The transferring personalized vocabulary processing block 370 proceeds to block 560 where the personal skill parser is retrained, and learning of the new personalized vocabulary is transferred across all personalized skills S being used by the user. Processing then proceeds to block 570 and stops.

Figure 6:
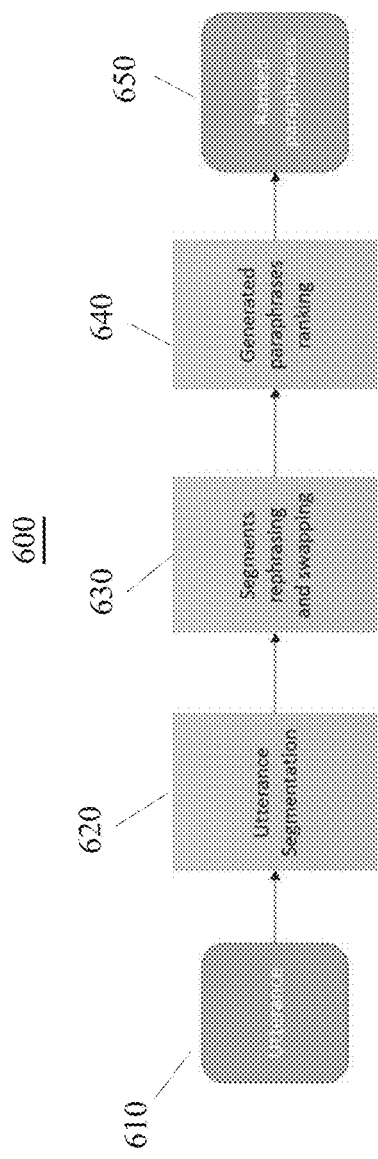
FIG. 6 shows a block diagram for segmentation rephrasing and swapping, according to some embodiments.

FIG. 6 shows a block diagram for segmentation rephrasing and swapping processing 600, according to some embodiments. Some embodiments generate structural variational paraphrases, meaning that the generated paraphrases have different variability in terms of the structure of details in the input utterance. A natural language utterance 610 is obtained/received (e.g., by a PA, such as PA 129, FIG. 1) and input into block 620 for utterance segmentation. In block 620, utterance segmentation generates the segments of the input utterance 610 and identifies the dependence of every segment in the utterance. The dependency here stands for a relation between a leading segment and a dependent segment, where the leading segment of a constituent was the central organizing word of a larger constituent (e.g., the primary noun in a noun phrase, or verb in a verb phrase) and the remaining words in the constituent are either direct, or indirect, dependents of their leading segment. In block 630 segments rephrasing and swapping includes generating the rephrasing of each segment and swapping the segments based on their dependencies. In block 640 generated paraphrase ranking includes ranking of the rephrased and swapped paraphrases based on a language model. The results of block 640 are output in block 650 as the ranked paraphrases. These ranked paraphrases can then be added to user specific training set as shown in block 551 during transferring personalized vocabulary processing.

Figure 7:
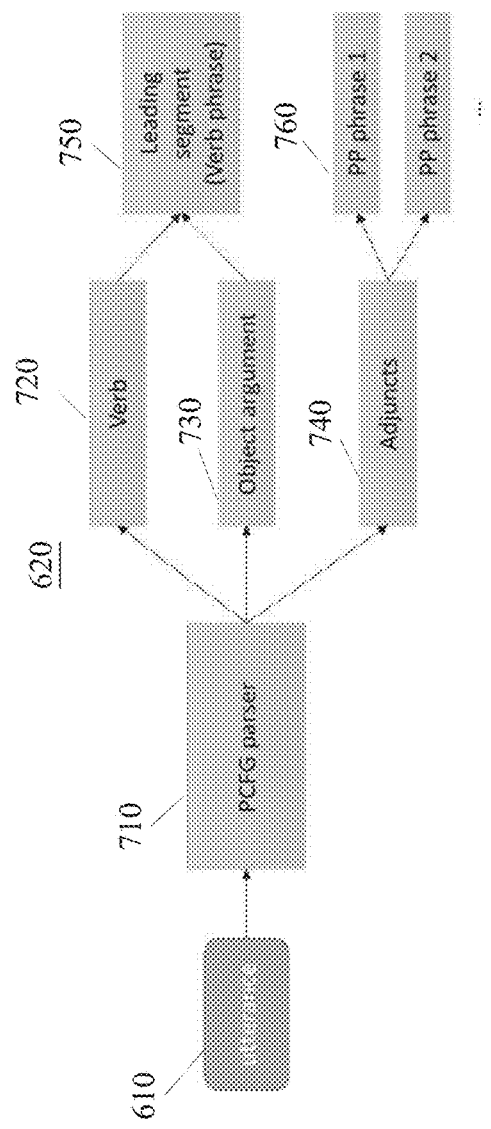
FIG. 7 shows a block diagram for utterance segmentation processing, according to some embodiments.

FIG. 7 shows a block diagram for utterance segmentation processing of block 620 (FIG. 6), according to some embodiments. In some embodiments, the utterance segmentation processing of block 620 has the following inputs: a user utterance 610 and a probabilistic context-free grammar (PCFG) parser 710. In one embodiment, the PCFG parser 710 works out the grammatical structure of sentences, including which groups of words go together as segments and the dependency between segments. The utterance segmentation processing of block 620 generates the parser tree of the input utterance 610 using the PCFG parser 710 and identifies the dependency relations between every part of the utterance 610. For example, it identifies the verb 720, the object argument 730 and the adjuncts 740. From the identified verb 720 and the object argument 730, the utterance 610 is segmented to generate the leading segment (including verb phrase) 750 of the input utterance 610; and the adjuncts 740 are segmented to generate the paraphrases 760 (paraphrase 1-N) of the input utterance 610.

Figure 8:
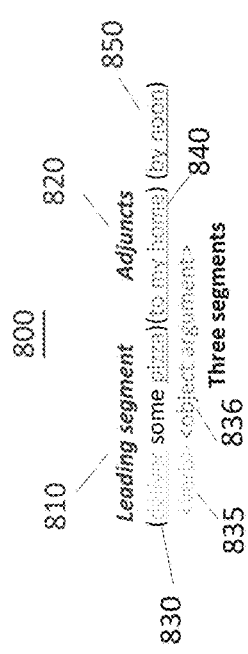
FIG. 8 shows an example of segmentation of an utterance, according to some embodiments.
Figure 10:
FIG. 10 shows an example of rephrased segments, according to some embodiments.

FIG. 8 shows an example of segmentation of an utterance 800, according to some embodiments. In the example, there are three segments including the leading segment 810 ("deliver some pizza") and two adjuncts 820 ("to my home" 840 and "by noon" 850). The utterance 800 includes a verb 835 of "deliver" 830 and object argument 836 of "some pizza." The utterance 800 is used to describe how some embodiments provide use of segmentation and rephrasing as shown in FIGS. 10 and 11.

Figure 9:
FIG. 9 shows a block diagram of processing for segmentation rephrasing and swapping, according to some embodiments.

FIG. 9 shows a block diagram of processing for block 630 (FIG. 6) segmentation rephrasing and swapping, according to some embodiments. In some embodiments, the segmentation and rephrasing and swapping processing includes block 910 segment concatenation and block 920 generation of paraphrases for concatenated segments. For block 910 segment concatenation, the segments of an input utterance are input, including one or more verb phrase and adjuncts. Block 910 segment concatenation generates the rephrase forms, the non-leading segments, by concatenating each of verb phrase with one of the adjuncts. For block 920 generation of paraphrases for concatenated segments, some embodiments may use any paraphrase generation algorithm to rephrase the non-leading segments, and use any paraphrase generation algorithm to rephrase the leading segment. For adjunct swapping, some embodiments permutate the segments generated in block 910 to generate the list of swapped paraphrases. If a set of segments are dependent on the same segment, they are swapped between each other to generate the list of swapped paraphrases FIG. 10 shows an example of rephrased segments, according to some embodiments. For this example, the input utterance 1010 is "deliver some pizza to my home by noon." The example non-leading segments 1020 are: "deliver some pizza to my home," and "deliver some pizza by noon," where the underlined words refer to the non-leading segments. The leading segment 1030 is: "deliver some pizza." The example result of rephrasing processing for the non-leading segments 1025 results in the following rephrases: "deliver some pizza for home," "deliver some pizza back home," "deliver some pizza to bring home . . . ," "deliver some pizza before noon," "deliver some pizza at noon," and "deliver some pizza around noon . . . ," where the underlined portions are the rephrased non-leading segment. For the rephrasing of the leading segment 1030, the example rephrased leading segments 1035 are: "get me some pizza," "buy a pizza," and "I want a piece of pizza . . . " The rephrasing of a segment is generated by any existing paraphrasing algorithm.

Figure 11:
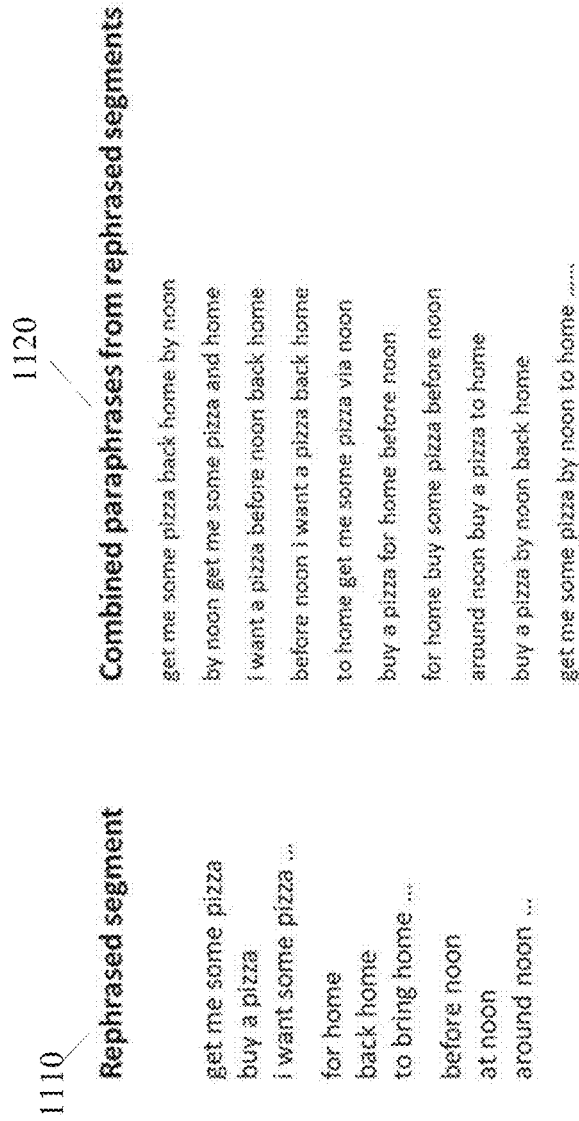
FIG. 11 shows an example of rephrased segments and combined paraphrases from rephrased segments, according to some embodiments.

FIG. 11 shows an example of rephrased segments 1110 and combined paraphrases from rephrased segments 1120, according to some embodiments. The rephrased segments are used to substitute the original segment in the utterance to generate a list of paraphrases. In this example, the rephrased segments 1110 are: "get me some pizza," "buy a pizza," and "I want some pizza . . . ," "for home," "back home," and to bring home;" and "before noon," "at noon," and "around noon . . . ". The combined paraphrases from rephrased segments 1120 are: "get me some pizza back home by noon," "by noon get me some pizza and home," "I want a pizza before noon back home," "before noon I want a pizza back home," "to home get me some pizza via noon," "buy a pizza for home before noon," "for home buy some pizza before noon," "around noon buy a pizza to home," "buy a pizza by noon back home," and "get me some pizza by noon to home . . . ."

Figure 12:
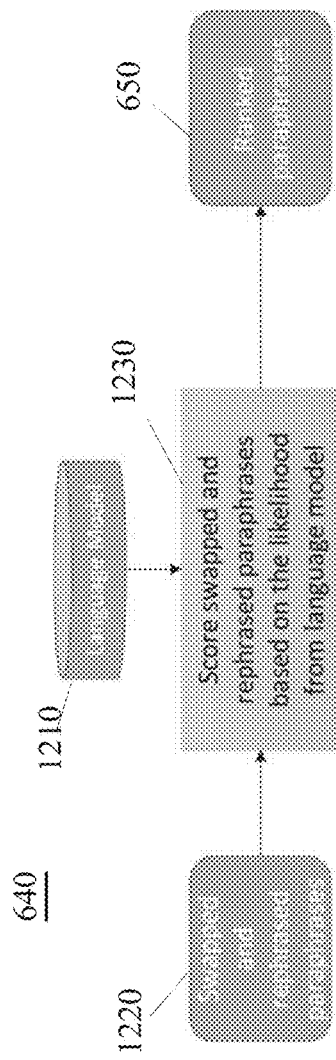
FIG. 12 shows a block diagram for swapped paraphrase ranking, according to some embodiments.

FIG. 12 shows a block diagram for swapped paraphrase ranking for block 640 (FIG. 6), according to some embodiments. In some embodiments, block 640 includes combined paraphrase ranking that takes the generated swapped and rephrased paraphrases 1220 and a language model 1210 as input. The language model 1210 is used to score each generated swapped and rephrased paraphrases based on the likelihood from the language model 1210. In some embodiments, in block 1230 the processing extracts each tuple of segments in the dictionary of rephrased segments, uses the language model 1210 to score each of the combination of permutated tuples, selects the lowest score among all combinations, marks this score as the score of the selected tuple, and derives the overall ranking of all swapped paraphrases (ranked paraphrases 650) by ranking the score on each combined tuple.

Figure 13:
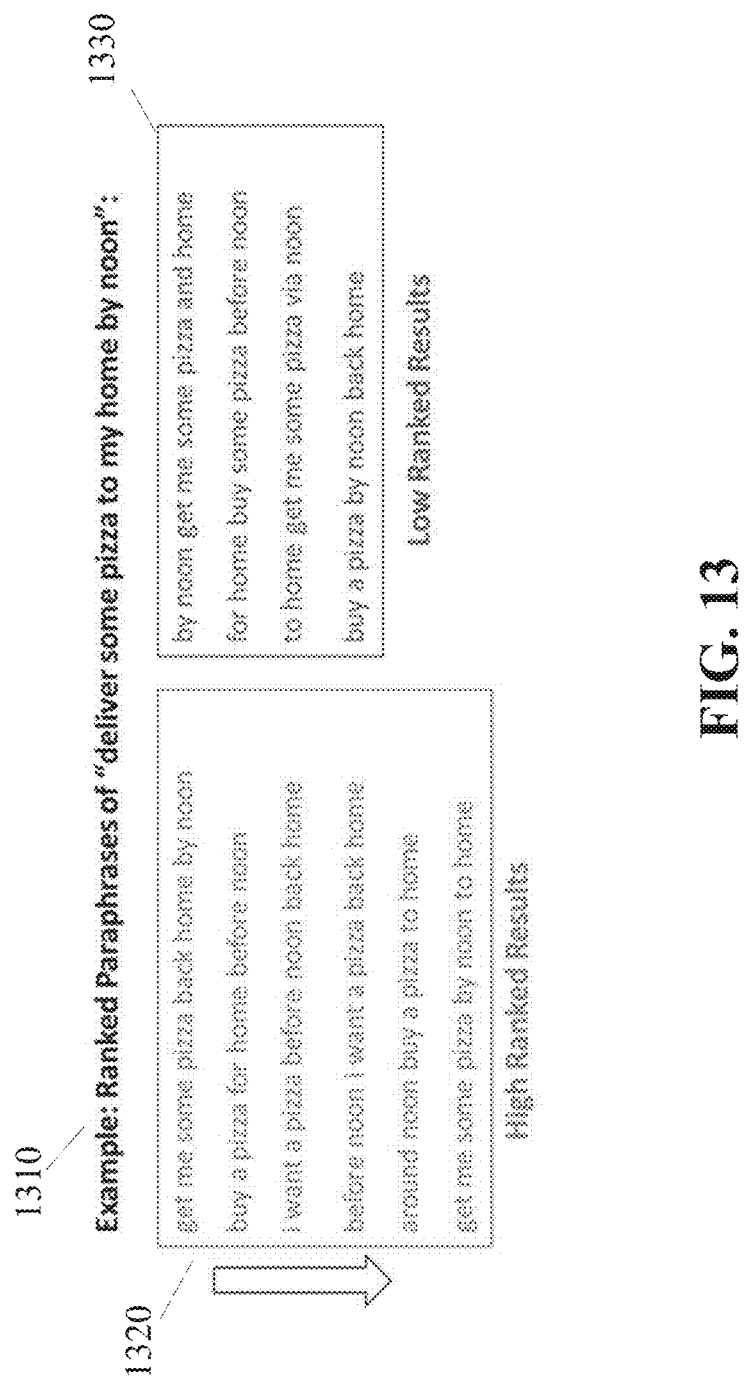
FIG. 13 shows an example of ranked paraphrases, according to some embodiments.

FIG. 13 shows an example of ranked paraphrases, according to some embodiments. In the example 1310 of ranked paraphrases of "deliver some pizza to my home by noon," the high ranked paraphrases 1320 (from the highest) include: "get me some pizza back home by noon," "buy a pizza for home before noon," "I want a pizza before noon back home," "before noon I want a pizza back home," "around noon buy a pizza to home," and "get me some pizza by noon to home." The low ranked paraphrases 1330 include (from higher to lower): "by noon get me some pizza and home," "for home buy some pizza before noon," "to home get me some pizza via noon," and "buy a pizza by noon back home."

Figure 14A:
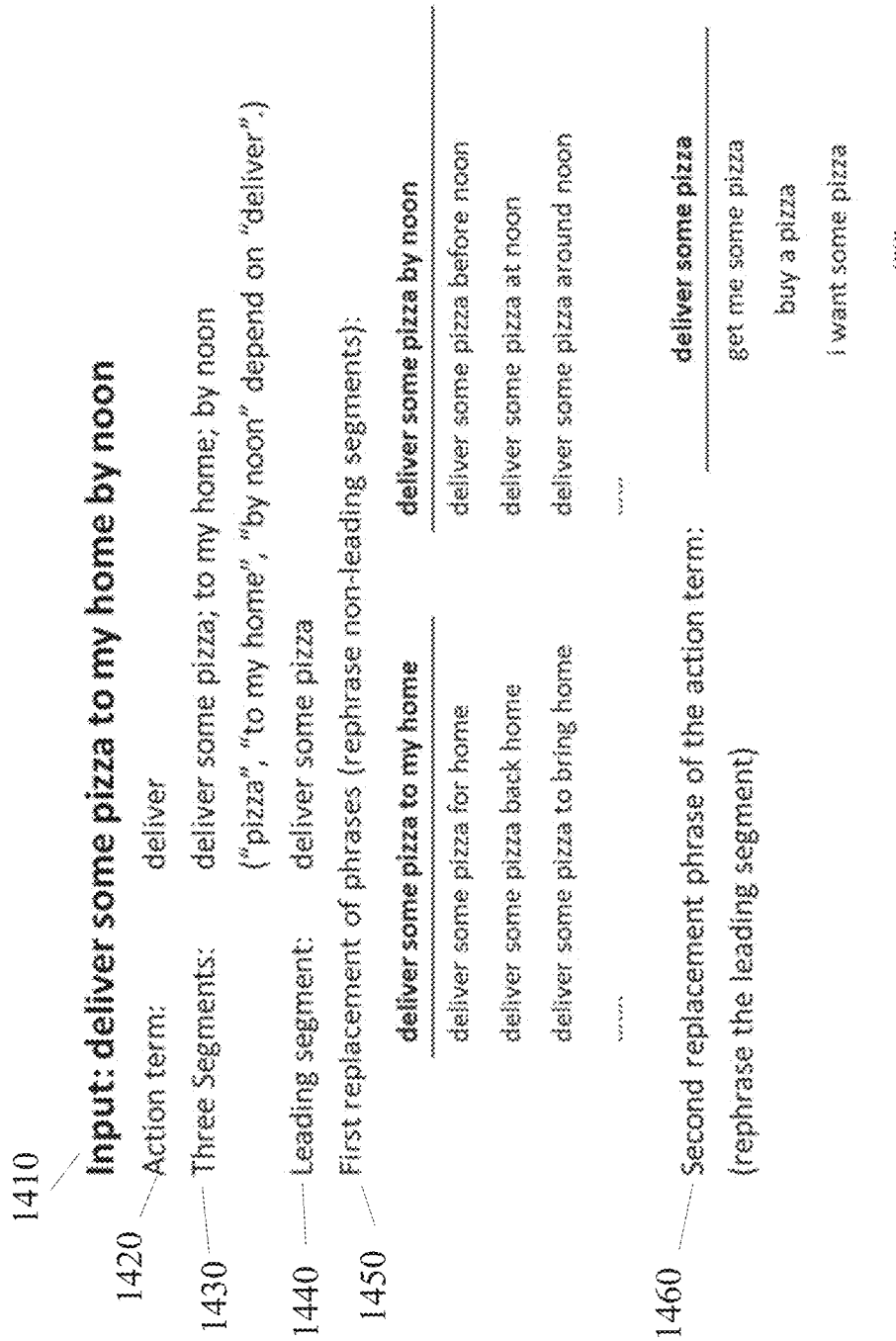

FIG. 14A-B shows an example of rephrased and swapped utterances, and an output of ranked paraphrases, according to some embodiments. For the example input utterance 1410 of "deliver some pizza to my home by noon," the action term 1420 is "deliver," the three segments 1430 are: "deliver some pizza," "to my home," and "by noon," and the leading segment 1440 is "deliver some pizza." In some example embodiments, the first replacement of phrases 1450, which is the rephrasing of the non-leading segments, includes replacement of "to my home" with "for home," "back home," and "to bring home;" and replacement of "by noon" with "before noon," "at noon," and "around noon."

The second replacement phrase of the action term 1460 "deliver some pizza" includes rephrasing the leading segment with "get me some pizza," "buy a pizza," "I want some pizza," etc. In some embodiments, the example rephrased and swapped utterances 1470 (by combining first and second replacements) include: "get me some pizza back home by noon," "by noon get me some pizza and home," "I want a pizza before noon back home," "before noon I want a pizza back home," "to home get me some pizza via noon," "buy a pizza for home before noon," "for home buy some pizza before noon," "around noon buy a pizza to home," "buy a pizza by noon back home," and "get me some pizza by noon to home," etc.

The final output of ranked paraphrases 1480 may include high ranked results 1490 of "get me some pizza back home by noon," "buy a pizza for home before noon," "I want a pizza before noon back home," "before noon I want a pizza back home," "around noon buy a pizza to home," and "get me some pizza by noon to home." The final output of ranked paraphrases 1480 may include high ranked results 1495 of "by noon get me some pizza and home," "for home buy some pizza before noon," "to home get me some pizza via noon," and "buy a pizza by noon back home."

FIG. 15 shows a block diagram of a process 1500 for generating structural variational paraphrases, according to some embodiments. In block 1510, process 1500 determines, by an electronic device (e.g., electronic device 120, FIG. 1), a skill based on a keyword from a first NL input. In block 1520, upon successful determination of the skill, process 1500 transmits the first NL input to a custom skill parser (e.g., personal skill parser 360, FIG. 3) for determination of a skill intent. In some embodiments, in process 1500 the custom skill parser is trained based on a custom training data set and a combination of multiple skill training data sets, and each skill training data set of the multiple skill training data sets includes data specific to a distinctive skill of a set of skills. In block 1530, upon unsuccessful determination of the skill, process 1500 transmits the first NL input to a generic parser (e.g., Intent Parser 325, FIG. 3) for determination of a general intent of the first NL input. In block 1540, upon successful determination of the skill intent, process 1500 adds the skill to the set of skills. In block 1550, upon unsuccessful determination of the skill intent, process 1500 prompts for a second NL input. In process 1500, the second NL input is a paraphrase of the first NL input.

In some embodiments, process 1500 may include transmitting the second NL input to the custom skill parser for determination of the skill intent, updating the custom training data set based on the first NL input and the skill intent, and training the custom skill parser based on both the combination of the multiple custom skill training data sets and the custom training data set.

In some embodiments, process 1500 may include generating segments from the first NL input. In process 1500, the segments may include a leading segment and one or more non-leading segments. Process 1500 may further include generating multiple rephrases from the segments, and swapping the segments based on dependencies of the segments to generate swapped rephrases. In some embodiments, process 1500 may include ranking the multiple rephrases and the swapped rephrases based on an input language model.

In some embodiments, in process 1500 generating the segments may include generating a parsing tree of the first NL input and a parser, identifying dependency relations between portions of the first NL input, identifying details of the first NL input, where the details include at least one verb, an object argument and one or more adjuncts, generating the leading segment of the first NL input based on the at least one verb and the object argument, and generating the multiple paraphrases based on the one or more adjuncts.

Figure 16:
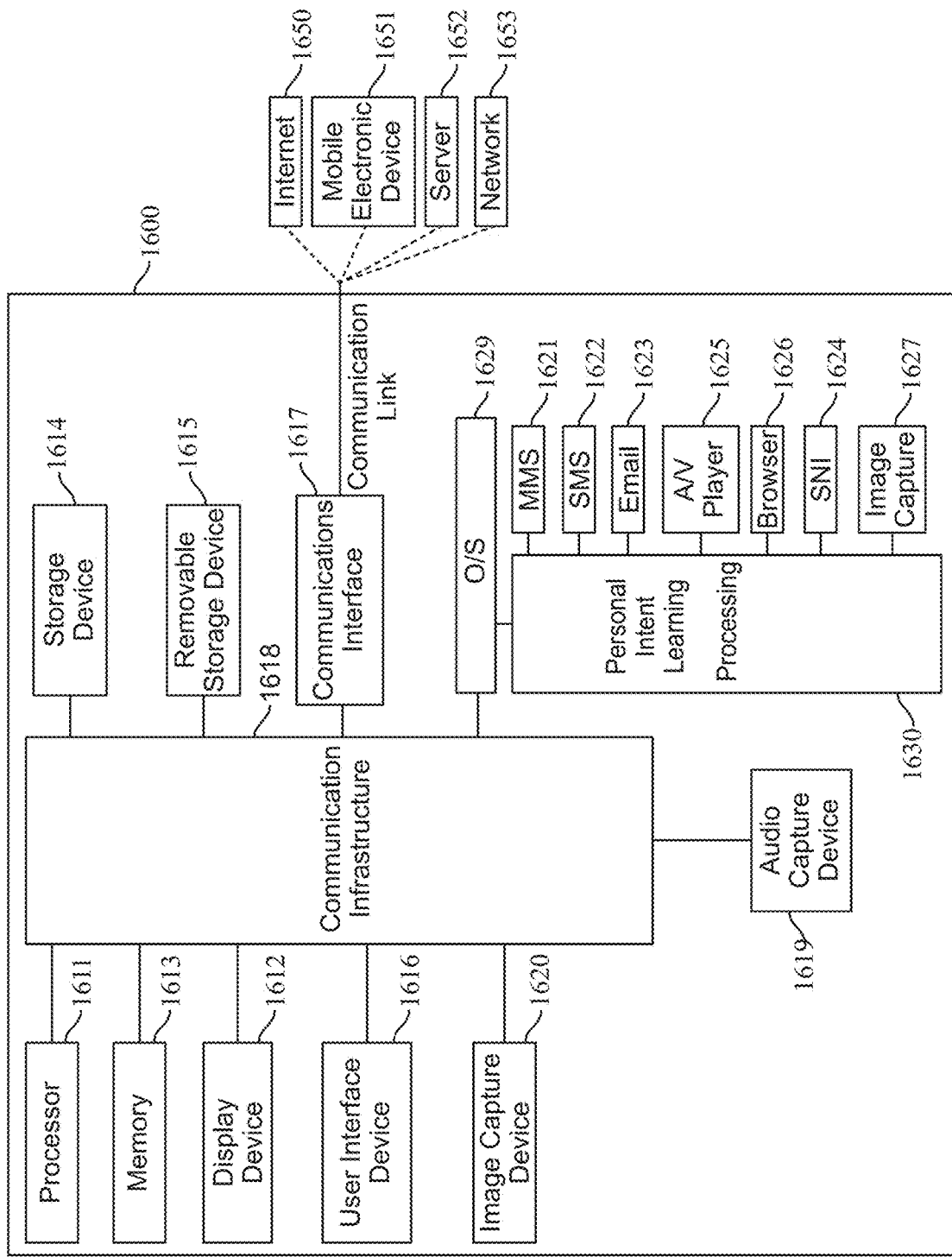
FIG. 16 is a high-level block diagram showing an information processing system comprising a computing system implementing one or more embodiments.

FIG. 16 is a high-level block diagram showing an information processing system comprising a computing system implementing one or more embodiments. The system 1600 includes one or more processors 1611 (e.g., ASIC, CPU, etc.), and may further include an electronic display device 1612 (for displaying graphics, text, and other data), a main memory 1613 (e.g., random access memory (RAM), cache devices, etc.), storage device 1614 (e.g., hard disk drive), removable storage device 1615 (e.g., removable storage drive, removable memory, a magnetic tape drive, optical disk drive, computer-readable medium having stored therein computer software and/or data), user interface device 1616 (e.g., keyboard, touch screen, keypad, pointing device), and a communication interface 1617 (e.g., modem, wireless transceiver (such as Wi-Fi, Cellular), a network interface (such as an Ethernet card), a communications port, or a PCMCIA slot and card).

The communication interface 1617 allows software and data to be transferred between the computer system and external devices through the Internet 1650, mobile electronic device 1651, a server 1652, a network 1653, etc. The system 1600 further includes a communications infrastructure 1618 (e.g., a communications bus, cross bar, or network) to which the aforementioned devices 1617 through 1617 are connected.

The information transferred via communications interface 1617 may be in the form of signals such as electronic, electromagnetic, optical, or other signals capable of being received by communications interface 1617, via a communication link that carries signals and may be implemented using wire or cable, fiber optics, a phone line, a cellular phone link, a radio frequency (RF) link, and/or other communication channels.

In one implementation of one or more embodiments in a mobile wireless device (e.g., a mobile phone, tablet, wearable device, etc.), the system 1600 further includes an image capture device 1620, such as a camera 128 (FIG. 1), and an audio capture device 1619, such as a microphone 122 (FIG. 1). The system 1600 may further include application processing or processors as MMS 1621, SMS 1622, email 1623, social network interface (SNI) 1624, audio/video (AV) player 1625, web browser 1626, image capture 1627, etc.

In one embodiment, the system 1600 includes personal intent learning processing 1630 that may implement processing similar as described regarding personal intent learning app 129 (FIG. 1), and for processing described above in relation to FIGS. 5-9. In one embodiment, the personal intent learning processing 1630 along with an operating system 1629 may be implemented as executable code residing in memory of the system 1600. In another embodiment, the personal intent learning processing 1630 may be provided in hardware, firmware, etc.

In one embodiment, the main memory 1613, storage device 1614 and removable storage device 1615, each by themselves or in any combination, may store instructions for the embodiments described above that may be executed by the one or more processors 1611.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method comprising:
   determining, by an electronic device, a skill from a first natural language (NL) input;
   upon successful determination of the skill, transmitting the first NL input to a custom skill intent parser for determination of a skill intent, wherein the custom skill intent parser is part of an artificial intelligence (AI) personal assistant (PA), and the custom skill intent parser is trained based on data including at least a custom training data set comprising a combined skill training set including a combination of a plurality of skill training data sets and user specific training data, and each skill training data set of the plurality of skill training data sets comprises utterances;
   upon unsuccessful determination of the skill, transmitting the first NL input to a generic skill intent parser for determination of a general intent of the first NL input;
   upon unsuccessful determination of the skill intent, determining whether to learn new vocabulary;
   upon receiving an indication to learn the new vocabulary, invoking a learn personalized vocabulary process for receiving a second NL input by the PA for one or more PA identified portions of the first NL input and learning the new vocabulary by the custom skill intent parser, wherein the second NL input received comprises one or more user specified paraphrases for the one or more PA identified portions of the first NL input; and
   upon an unsuccessful determination of skill intent for the new vocabulary for the custom skill parser, the first NL input and intent for the second NL input are added to the user specific training data, retraining the custom skill intent parser for the learning, and transferring the learning of the new vocabulary across all personalized skills used by a user via the electronic device.

2. The method of claim 1, wherein each skill training data set of the plurality of skill training data sets includes data specific to a distinctive skill of a set of skills, and a skill refers to a specialized domain where the PA understands, interprets or parses commands related to the specialized domain.

3. The method of claim 2, further comprising:
   upon successful determination of the skill intent, adding the skill to the set of skills,
   wherein the skill intent refers to a specific goal desired to be accomplished within the specialized domain, and one or more PA identified portions of the first NL input is highlighted on a display of the electronic device.

4. The method of claim 2, further comprising:
   upon a determination that the second NL input is based on an utterance that is not included to the custom skill intent parser, updating the custom skill intent parser with a new skill invocation keyword,
   wherein the user personalized vocabulary information comprises learned user specified paraphrases, and each skill has its own distinct skill training set.

5. The method of claim 4, further comprising:
   transmitting the second NL input to the custom skill intent parser for determination of the skill intent;
   updating the custom training data set based on the first NL input and the skill intent; and
   training the custom skill intent parser based on the custom skill training data.

6. The method of claim 4, further comprising:
   generating segments from the first NL input, wherein the segments comprise a leading segment and one or more non-leading segments;
   identifying dependence of each of the segments;
   generating a plurality of rephrases from the segments; and
   swapping the segments based on the identified dependence of each of the segments to generate swapped rephrases.

7. The method of claim 6, further comprising:
   ranking the plurality of rephrases and the swapped rephrases based on an input language model; and
   adding the ranked plurality of rephrases to the user specific training data during the transferring of the learning.

8. The method of claim 6, wherein generating the segments comprises:
   generating a parsing tree using the first NL input and a parser;
   identifying dependency relations between portions of the first NL input;
   identifying details of the first NL input, wherein the details comprise at least one verb, an object argument and one or more adjuncts;
   generating the leading segment based on the at least one verb and the object argument; and
   generating the plurality of rephrases based on the one or more adjuncts.

9. An electronic device comprising:
   memory storing instructions; and
   at least one processor executing the instructions including a process configured to:
   determine a skill from a first natural language (NL) input;
   upon successful determination of the skill, transmit the first NL input to a custom skill intent parser for determination of a skill intent, wherein the custom intent skill parser is part of an artificial intelligence (AI) personal assistant (PA), and the custom skill intent parser is trained based on data including at least a custom training data set comprising a combined skill training set including a combination of a plurality of skill training data sets and user specific training data, and each skill training data set of the plurality of skill training data sets comprises utterances;
   upon unsuccessful determination of the skill, transmit the first NL input to a generic skill intent parser for determination of a general intent of the first NL input;
   upon unsuccessful determination of the skill intent, determine whether to learn new vocabulary;
   upon receiving an indication to learn the new vocabulary, invoking a learn personalized vocabulary process for receiving a second NL input by the PA for one or more PA identified portions of the first NL input and learning the new vocabulary by the custom skill intent parser, wherein the second NL input received comprises one or more user specified paraphrases for the one or more PA identified portions of the first NL input; and
   upon an unsuccessful determination of skill intent for the new vocabulary for the custom skill parser, the first NL input and intent for the second NL input are added to the user specific training data, retraining the custom skill intent parser for the learning, and transferring the learning of the new vocabulary across all personalized skills used by a user via the electronic device.

10. The electronic device of claim 9, wherein each skill training data set of the plurality of skill training data sets includes data specific to a distinctive skill of a set of skills, and a skill refers to a specialized domain where the PA understands, interprets or parses commands related to the specialized domain.

11. The electronic device of claim 10, further comprising:
upon successful determination of the skill intent, adding the skill to the set of skills;
wherein the skill intent refers to a specific goal desired to be accomplished within the specialized domain, and one or more PA identified portions of the first NL input is highlighted on a display of the electronic device.

12. The electronic device of claim 11, further comprising:
transmitting the second NL input to the custom skill intent parser for determination of the skill intent;
updating the custom training data set based on the first NL input and the skill intent; and
training the custom skill intent parser based on custom skill training data set.

13. The electronic device of claim 11, further comprising:
generating segments from the first NL input, wherein the segments comprise a leading segment and one or more non-leading segments;
identifying dependence of each of the segments;
generating a plurality of rephrases from the segments;
swapping the segments based on the identified dependence of each of the segments to generate swapped rephrases; and
upon a determination that the second NL input is based on an utterance that is not included to the custom skill intent parser, updating the custom skill intent parser with a new skill invocation keyword, wherein the user personalized vocabulary information comprises learned user specified paraphrases.

14. The electronic device of claim 13, further comprising:
ranking the plurality of rephrases and the swapped rephrases based on an input language model; and
adding the ranked plurality of rephrases to the user specific training data during the transferring of the learning.

15. The electronic device of claim 13, wherein generating the segments comprises:
generating a parsing tree using the first NL input and a parser;
identifying dependency relations between portions of the first NL input;
identifying details of the first NL input, wherein the details comprise at least one verb, an object argument and one or more adjuncts;
generating the leading segment based on the at least one verb and the object argument; and
generating the plurality of rephrases based on the one or more adjuncts.

16. A non-transitory processor-readable medium that includes a program that when executed by a processor performing a method comprising:
determining, by an electronic device, a skill from a first natural language (NL) input;
upon successful determination of the skill, transmitting the first NL input to a custom skill intent parser for determination of a skill intent, wherein the custom skill intent parser is part of an artificial intelligence (AI) personal assistant (PA), and the custom skill intent parser is trained based on data including at least a custom training data set comprising a combined skill training set including a combination of a plurality of skill training data sets and user specific training data, and each skill training data set of the plurality of skill training data sets comprises utterances;
upon unsuccessful determination of the skill, transmitting the first NL input to a generic skill intent parser for determination of a general intent of the first NL input;
upon unsuccessful determination of the skill intent, determining whether to learn new vocabulary;
upon receiving an indication to learn the new vocabulary, invoking a learn personalized vocabulary process for receiving a second NL input by the PA for one or more PA identified portions of the first NL input and learning the new vocabulary by the custom skill intent parser, wherein the second NL input received comprises one or more user specified paraphrases for the one or more PA identified portions of the first NL input; and
upon an unsuccessful determination of skill intent for the new vocabulary for the custom skill parser, the first NL input and intent for the second NL input are added to the user specific training data, retraining the custom skill intent parser for learning, and transferring the learning of the new vocabulary across all personalized skills used by a user via the electronic device.

17. The non-transitory processor-readable medium of claim 16, wherein each skill training data set of the plurality of skill training data sets includes data specific to a distinctive skill of a set of skills, and a skill refers to a specialized domain where the PA understands, interprets or parses commands related to the specialized domain.

18. The non-transitory processor-readable medium of claim 17, wherein the method further comprises:
upon successful determination of the skill intent, adding the skill to the set of skills;
transmitting the second NL input to the custom skill intent parser for determination of the skill intent;
updating the custom training data set based on the first NL input and the skill intent; and
training the custom skill intent parser based on the custom skill training data set; wherein the skill intent refers to a specific goal desired to be accomplished within the specialized domain, and one or more PA identified portions of the first NL input is highlighted on a display of the electronic device.

19. The non-transitory processor-readable medium of claim 18, wherein the method further comprises:
generating segments from the first NL input, wherein the segments comprise a leading segment and one or more non-leading segments;
identifying dependence of each of the segments;
generating a plurality of rephrases from the segments;
swapping the segments based on the identified dependence of the segments to generate swapped rephrases;
ranking the plurality of rephrases and the swapped rephrases based on an input language model;
adding the ranked plurality of rephrases to the user specific training data during the transferring of the learning; and
upon a determination that the second NL input is based on an utterance that is not included to the custom skill intent parser, updating the custom skill intent parser with a new skill invocation keyword, wherein the user personalized vocabulary information comprises learned user specified paraphrases, and each skill has its own distinct skill training set.

20. The non-transitory processor-readable medium of claim 19, wherein generating the segments comprises:
generating a parsing tree using the first NL input and a parser;

identifying dependency relations between portions of the first NL input;

identifying details of the first NL input, wherein the details comprise at least one verb, an object argument and one or more adjuncts;

generating the leading segment based on the at least one verb and the object argument; and generating the plurality of rephrases based on the one or more adjuncts.

* * * * *